United States Patent [19]

Kuhasalo et al.

[11] Patent Number: 4,657,678

[45] Date of Patent: Apr. 14, 1987

[54] TWIN HYDROCYCLONE

[75] Inventors: Antti Kuhasalo; Pentti Vikiö, both of Savonlinna, Finland

[73] Assignee: Enso-Gutzeit Oy

[21] Appl. No.: 713,438

[22] Filed: Mar. 19, 1985

[30] Foreign Application Priority Data

Mar. 19, 1984 [FI] Finland .................................. 841099

[51] Int. Cl.[4] ............................................ B01D 17/038

[52] U.S. Cl. .................................. 210/512.2; 209/211; 162/55

[58] Field of Search ................................ 209/144, 211; 210/512.1, 512.2, 304; 406/173; 55/337, 345, 447, 452, 456; 241/275; 162/384, 55

[56] References Cited

U.S. PATENT DOCUMENTS 3,084,798 4/1963 Lau ........................................ 209/144
3,971,718 7/1976 Reid ....................................... 209/211
4,148,722 4/1979 Surakka et al. ...................... 209/211

FOREIGN PATENT DOCUMENTS 2128905 5/1984 European Pat. Off. ............ 209/211
56868 12/1979 Finland .
865416 9/1981 U.S.S.R. .............................. 209/211

*Primary Examiner*—Richard V. Fisher
*Assistant Examiner*—Wanda L. Millard
*Attorney, Agent, or Firm*—Toren, McGeady and Goldberg

[57] ABSTRACT

A twin hydrocyclone used for instance in cellulose and paper mills for purifying pulp suspension, the twin hydrocyclone consisting of two hydrocyclones mounted with their larger ends against each other and having one common infeed connector and one common purified fraction discharge connector. The hydrocyclones of prior art have the drawback of complex design and of division of the feed flow causing disturbances in the feed flow in view of the hydrocyclone's operation. The twin hydrocyclone, meant to solve these problems, is characterized in that the feed flow from the common infeed connector of the hydrocyclones is directed to each hydrocyclone as a separate feed flow by means of a helical member the helices of which constitute, in each hydrocyclone, feeding ducts confined by the walls of the hydrocyclones.

7 Claims, 5 Drawing Figures

TWIN HYDROCYCLONE

BACKGROUND OF THE INVENTION

The present invention concerns a twin hydrocyclone used for instance in cellulose and paper mills for purifying pulp suspension, said twin hydrocyclone consisting of two hydrocyclones mounted with their larger diameter ends against each other, said hydrocyclones having one common infeed connector and one common purified fraction discharge connector.

Hydrocyclones, or vortex purifiers, are commonly used in cellulose and paper industry for separating various dirt particles from fiber suspensions, such as sand, bark particles, sticks, stubs of branches and metal chips. The fiber suspension to be purified is conducted under pressure into the hydrocyclone through a tangential infeed connector, whereby the suspension is set in a rapid helical rotary movement, the constituents of the fiber suspension with different specific gravity and shape being separated by action of the centrifugal force created by this movement. As the fiber suspension proceeds along a helical path towards the apex of the cone, the constituents with higher specific gravity, such as sand, are flung to the outer circumference of the rotational movement, close to the wall of hydrocyclone. The impurities concentrated in a layer flowing on a helical path along the wall towards the apical aperture of the cone emerge from the hydrocyclone through the apical aperture of the cone as reject fraction. The fiber suspension purified from dirt particles constitutes a helical flow having a pitch opposite to that of the aforementioned helical flow generated in said feeding event, and it emerges through the central connector of the cylindrical separating chamber opposite to the cone.

The twin hydrocyclone also operates on the principle just mentioned. The twin hydrocyclone comprises two separate hydrocyclones fixedly joined by their ends adjacent to the cylindrical separating chamber so that feeding of the hydrocyclones and the withdrawing of the accepted fraction have been connected. The principle of the twin hydrocyclone is readable in the Finnish Pat. No. 56868.

Nowadays it is quite commonplace that hydrocyclones are made of a synthetic material by die-casting the synthetic mix, heated to fluid state, in a dimensionally accurate negative mold, in which the synthetic mass forms the object itself as it cools. When this method is used, the body has to be given such shape that the wall thicknesses of the finished object are uniform and all material concentrations are avoided. Hereby, the cooling of the mass will be uniform, and the object that is produced will exactly retain its shape in the cooling phase, and there will also be no residual stresses in the object which might later during use, together with the operating load acting on the object, result in breakage of the object.

Twin hydrocyclones of prior art have the drawback of complex design, and division of the feed flow which causes disturbances in the feed flow in view of the hydrocyclone's operation. Moreover, in the twin hydrocyclone designs of prior art, the shape and dimensions of the hydrocyclones are such that their manufacturing by the modern methods described in the foregoing cannot be contemplated.

Endeavors have been made to eliminate the disturbances caused by the deficient feeding event in the designs of prior art, by increasing the velocity of the feed flow, with the consequence of increased pressure drop and, therefore, higher energy requirements. As a result of the increase of energy costs, these designs of prior art have become costly as to their operating costs.

In the extremely comprehensive and multiple-step trial runs on which the present invention is based has been observed the indisputable effect of the feeding event on the efficiency with which the hydrocyclone separates the minimal impurity fractions having a specific gravity closely similar to that of the fibers, and which have been the most difficult to separate from the fiber suspension. When aiming at top separation efficiency of said impurity fractions which are difficult to separate, the feeding event of the hydrocyclones has to be dimensioned and constructed in proportion to the other dimensions of the hydrocyclones in such manner that not even the smallest flow interfering with the internal operation of the hydrocyclone, or turbulent flow, vortex, etc. will arise.

OBJECT OF THE INVENTION

The object of the present invention is to eliminate the drawbacks present in the twin hydrocyclones of prior art to which reference has been made. The invention is characterized in that the feed flow from the infeed connector common to the hydrocyclones is conducted to each hydrocyclone to be a separate feed flow, this being done with a helical member of which the turns constitute, in each hydrocyclone, feeding ducts confined by the hydrocyclone walls. It is a further characteristic feature that said helical member consists of two different-handed helices. Hereby, all the pressure energy used towards accelerating the feed flow will be utilized in the purifying event proper, and vortices and other energy-wasting flows are prevented by optimal shaping. By the optimal shaping also that advantage is gained that the twin hydrocyclone can be produced by the modern production method described in the foregoing because the juncture is symmetric and does not contain any concentrations of the material. The free space with breadth equal to pitch of the helix, left between the helices continuing over 360 degrees from the juncture of the different-handled helices, establishes a feeding channel between the outer shell and the accepted fraction discharge tube. The pitch of the helices is constant on the part extending from the juncture over a length more than one fifth the feeding duct length.

BRIEF DESCRIPTION OF THE DRAWINGS

The invention is described in detail in the following, referring to the drawing attached, wherein.

DETAILED DESCRIPTION OF PREFERRED EMBODIMENTS

Figure 1:
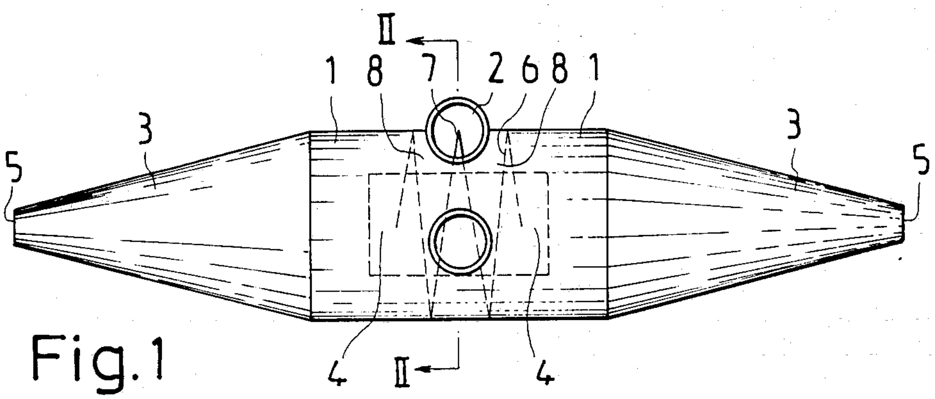
FIG. 1 presents the twin hydrocyclone design of the invention in elevational view.

The twin hydrocyclone consists, as shown in FIG. 1, of two separate hydrocyclones 1 which have been connected fixedly together by their ends adjacent to the cylindrical separation chamber so that the hydrocyclones have a common infeed and a common accepted fraction discharge connector. The separate, identical hydrocyclones of the twin hydrocyclone comprise a separating chamber, consisting of a cylindrical part 1 provided with a tangential in-feed connector 2, in the design of the invention common to both hydrocyclones, and of a cone 3 in extension of the cylindrical part 1. Into the cylindrical part of the hydrocyclone extends the centric accepted fraction discharge tube 4. At the apex of the cone is placed the exit aperture 5 for the reject fraction. On the cylindrical part between, the accepted fraction discharge tube and the cylinder shell is confined a two-handed helical part 6, the juncture 7 of its different-handed helices being located on the line of symmetry of the twin hydrocyclone in the center of the tangential common infeed connector and thus serving as feed flow divider between the separate hydrocyclones of the twin hydrocyclone. The channels 8 which the sides of the helices of the helical part confine between themselves serve as feeding channels through which the parts of the feed flow subdivide by the juncture of the helices are supplied into the twin hydrocyclone. The cross-section area and shape of the part of the feeding ducts extending from the juncture are constant.

Figure 2:
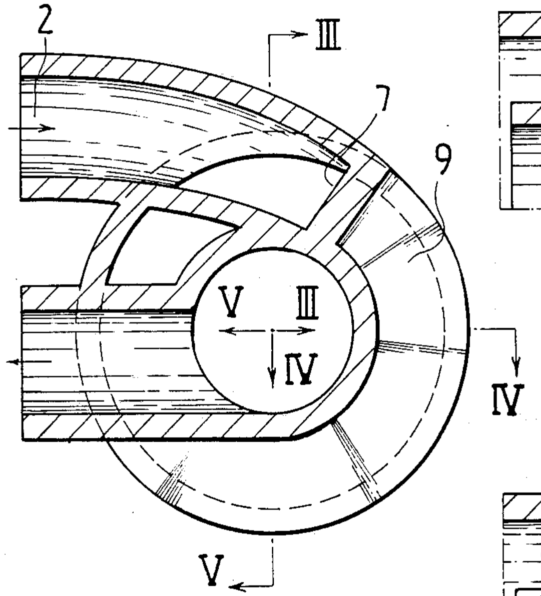
FIG. 2 shows the section along the line II—II in FIG. 1, FIGS. 3-5 show the sections along lines III—III, IV—IV and V—V in FIG. 2.

As shown in FIG. 2, the infeed connector 2 joins the feeding part of the twin hydrocyclone, whereby the kinetic energy of the feed flow which this flow possesses when entering the hydrocyclone is efficiently utilized and no turbulence is produced in the flow, nor any abrupt charges in direction of motion which would give rise to disturbances. The dividing tip 7 formed at the juncture of the helices divides the flow into the feed flows of the two hydrocyclones. After the tip, the feeding helices separate, whereby the space between the helices opens and widens as shown in FIGS. 3–5 between the different-handed helices, whereby no material concentrations are formed in the structure.

Figure 3:
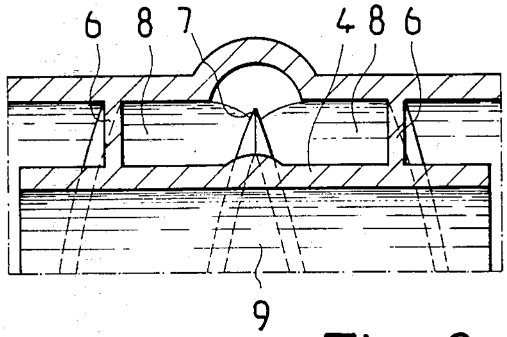

As shown in FIG. 3, the two-directional helices of the two-handed helical part 6 continue beyond one turn, whereby the channel defined between the sides of the helices, the outer shell and the accepted fraction discharge tube continues as a feeding channel with uniform size for that length which the sides of the two-directional helix extend beyond one turn. The dimensions of the feeding ducts between the turns of the helix and between the outer surface of the accept fraction discharge tube and the inner surface of the cylindrical part are in a ratio of $\geqq 2.5$.

Figure 4:
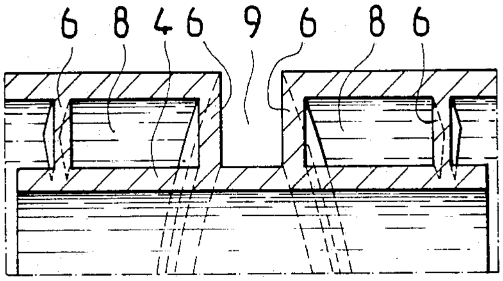
Figure 5:
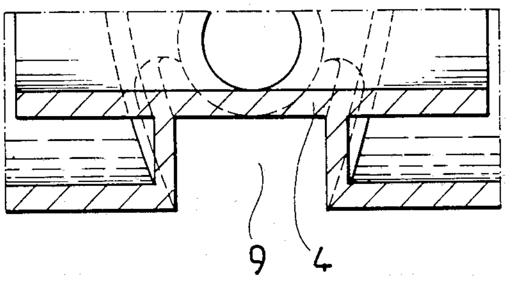

As shown in FIGS. 4 and 5, the feeding channel 8 opens into the hydrocyclone so that the feed flow from the feeding channel to the hydrocyclone will continue its movement as an accurately guided flow parallelling the side of the feeding helix, closely controlled as to its pitch.

It is obvious to a person skilled in the art that the invention is not confined to the embodiments of the disclosure part and figures and that it may instead be modified within the scope of the claims following below.

We claim:

1. A twin hydrocyclone, used in cellulose and paper mills towards the purifying of pulp suspension, said twin hydrocyclone comprising a first and second cone placed with their larger ends against each other and which have one common infeed connector and one common discharge connector for the purified fraction, wherein the improvement comprises an axially extending cylindrical part (1) having a first end and a second end, said first cone (3) extending outwardly from the first end of said cylindrical part in the axial direction of said cylindrical part, said second cone (3) extending outwardly from the second end of said cylindrical part in the axial direction of said cylindrical part, said two hydrocyclones having a line of symmetry extending transversely of said cylindrical part and spaced between the first and second ends thereof, an accepted fraction discharge tube (4) located within and arranged coaxially with said cylindrical part, said accepted fraction discharge tube (4) spaced inwardly from said cylindrical part and forming therebetween an annular passage, said cylindrical part has a common infeed connector (2) located at the line of symmetry of the two hydrocyclones and directed tangentially to said cylindrical part and in fluid communication with said annular passage, a helical member located within said annular passage and extending transversely between the inner surface of said cylindrical part and the outer surface of said accept fraction discharge tube, said helical member comprises a first and a second helix each extending in an opposite direction around the axis of said cylindrical part from a juncture of said first and second helices formed on the line of symmetry so that said first helix extends from the line of symmetry toward the first end of said cylindrical part and said second helix extends from the line of symmetry toward the second end of said cylindrical part, said first and second helices in combination with the inner surface of said cylindrical part and the outer surface of said accept fraction discharge tube each forming a separate feeding duct extending from said juncture at the line of symmetry.

2. Twin hydrocyclone according to claim 1, characterized in that said first and second helices are each a different-handed helix.

3. Twin hydrocyclone according to claim 1, characterized in that the juncture of the first and second helices forms a streamline dividing tip for dividing the feed flow from the common infeed connector of the hydrocyclones into a separate feed flow formed by said separate feeding ducts for each hydrocyclone.

4. Twin hydrocyclone according to claim 1 characterized in that the first and second helices extend around the axis of said cylindrical part for more than 360°.

5. Twin hydrocyclone according to claim 1, characterized in that the pitch of the first and second helices is constant on the part of the helix extending from said juncture over a length more than one fifth of the feeding duct length.

6. Twin hydrocyclone according to claim 1, characterized in that the cross-section area and shape of the part of the feeding ducts extending from said juncture are constant.

7. Twin hydrocyclone according to claim 1, characterized in that the dimensions of said feeding ducts between the turns of the helix and between the outer surface of the accept fraction discharge tube and the inner surface of the cylindrical part are in a ratio of $\geqq 2.5$.

* * * * *